(12) United States Patent
Steffin

(10) Patent No.: US 7,680,302 B2
(45) Date of Patent: Mar. 16, 2010

(54) METHOD AND APPARATUS FOR DETECTION OF DROWSINESS AND QUANTITATIVE CONTROL OF BIOLOGICAL PROCESSES

(76) Inventor: Morris Steffin, 7021 E. Jackrabbit Rd., Paradise Valley, AZ (US) 85253

( * ) Notice: Subject to any disclaimer, the term of this patent is extended or adjusted under 35 U.S.C. 154(b) by 0 days.

(21) Appl. No.: 12/004,684

(22) Filed: Dec. 20, 2007

(65) Prior Publication Data

US 2008/0192983 A1    Aug. 14, 2008

Related U.S. Application Data

(63) Continuation of application No. 10/692,834, filed on Oct. 23, 2003, now Pat. No. 7,336,804.

(60) Provisional application No. 60/421,690, filed on Oct. 28, 2002.

(51) Int. Cl.
G06K 9/00 (2006.01)
(52) U.S. Cl. .................................. 382/103; 382/115
(58) Field of Classification Search ................. 382/103, 382/115, 117, 118, 104
See application file for complete search history.

(56) References Cited

U.S. PATENT DOCUMENTS

| | | | |
|---|---|---|---|
| 4,396,903 A | 8/1983 | Habicht et al. | |
| 5,786,765 A | 7/1998 | Kumakura et al. | |
| 5,805,720 A | 9/1998 | Suenaga et al. | |
| 5,859,686 A | 1/1999 | Aboutalib et al. | |
| 5,859,921 A | 1/1999 | Suzuki et al. | |
| 5,867,587 A | 2/1999 | Aboutalib et al. | |
| 5,905,807 A | 5/1999 | Kado et al. | |
| 6,082,858 A | 7/2000 | Grace et al. | |
| 6,130,617 A * | 10/2000 | Yeo ............................ | 340/575 |

(Continued)

FOREIGN PATENT DOCUMENTS

WO    WO-97/05566    2/1997

OTHER PUBLICATIONS

Steffin, M., "Video Preprocessing of Patient Environment Data For Use in Virtual Reality Assisted Physical Therapy Systems", Cyberpsychology & Behavior, 1998, pp. 177-185, vol. 1, Issue 2.

(Continued)

*Primary Examiner*—Brian Q Le
*Assistant Examiner*—Claire Wang
(74) *Attorney, Agent, or Firm*—Morrison & Foerster LLP

(57) ABSTRACT

The present invention is directed to a real-time automated video cognizer that functions as a facial video processor for detecting drowsiness in operators of motorized vehicles, including the use of a video cognizer to provide pattern recognition and control signal generation during monitoring of macroscopic or microscopic biological processes. More specifically, the present invention accepts input from a video monitoring system that continuously captures the operator's facial images; employing three sequential means of processing the digitized video information to extract the position and configuration of drowsy-relevant facial features and numerically processes this information to yield a quantitative estimate of drowsiness probability in each epoch of monitoring. The means of the present invention are noninvasive, do not restrict driver movement or performance, provide increased measurement reliability for actual driver behavior, and include the capability of generating or triggering suitable alarms when drowsiness occurs.

6 Claims, 12 Drawing Sheets

Video Line Filter Means: eyes

U.S. PATENT DOCUMENTS

| | | | |
|---|---|---|---|
| 6,163,281 | A | 12/2000 | Torch |
| 6,243,015 | B1 | 6/2001 | Yeo et al. |
| 6,542,081 | B2 | 4/2003 | Torch |
| 6,661,345 | B1 | 12/2003 | Bevan et al. |
| 6,714,665 | B1 * | 3/2004 | Hanna et al. ............ 382/117 |
| 6,756,903 | B2 | 6/2004 | Omry et al. |
| 6,924,832 | B1 | 8/2005 | Shiffer et al. |
| 6,974,414 | B2 | 12/2005 | Victor et al. |
| 7,027,621 | B1 | 4/2006 | Prokoski |
| 7,043,056 | B2 | 5/2006 | Edwards et al. |
| 7,183,932 | B2 | 2/2007 | Bauer |
| 2004/0247183 | A1 | 12/2004 | Molander |

OTHER PUBLICATIONS

Steffin, M., Quantitative Video Analysis of Complex Epileptic Seizures During Videotelemetry: Increasing the Reliability of EEG Correlation and Behavioral Autocorrelation:, Cyberpsychology & Behavior, 1999, pp. 25-33, vol. 2, Issue 1.

Steffin, M., "Virtual Reality to Evaluate Motor Response During Seizure Activity", Lorenzo NY, Lutsep H. (eds), www.emedicine.com:Neurology, Computer Applications in Neurology, 1999, obtained from website where article was updated in 2006.

Steffin, M., Visual-Haptic Interfaces: Modification of Motor and Cognitive Performance, Lorenzo NY, Lutsep H. (eds), www.emedicine.com:Neurology, Computer Applications in Neurology, 1999, obtained from website where article was updated in 2007.

Steffin, M., "Bridging the Gap Between "Real Reality", and Virtual Reality: Intelligent Human-Machine Therapeutic Interaction in Patient Videospace", Cyberspace & Behavior, 2000, pp. 447-463, vol. 3, Issue 3.

Steffin, M. et al., "Occam's Approach to Video Critical Behavior Detection: A Practical Real Time Video In-Vehicle Alertness Monitor, Presented: Proceedings Medicine Meets Virtual Reality 12", JD Westwood et al. (eds), Jan. 2004, pp. 370-375, presented at Medicine Meets Virtual Reality 12, Newport Beach, California.

Steffin, M. "Avionics-Compatible Video Facial Cognizer for Detection of Pilot Incapacitation, Presented: Proceedings Medicine Meets Virtual Reality 14", JD Westwood et al. (eds), 2006, pp. 529-531, IOS Press, Amsterdam (shortened version).

* cited by examiner

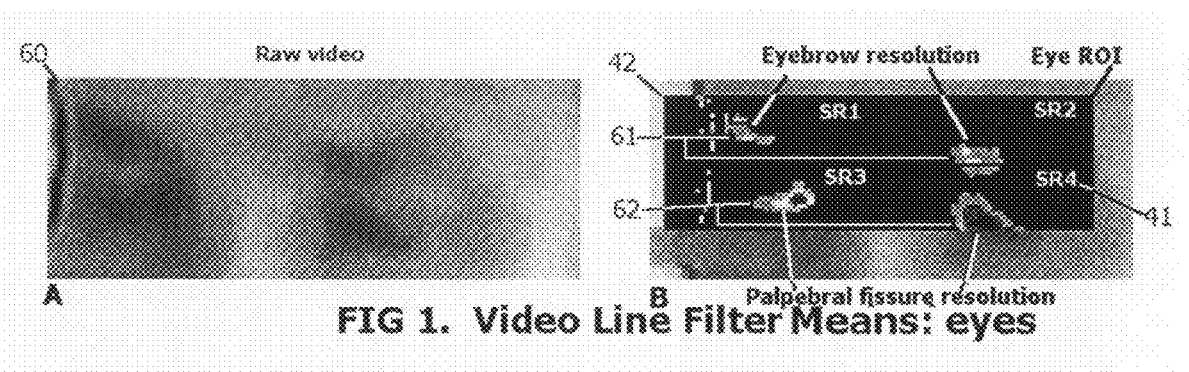

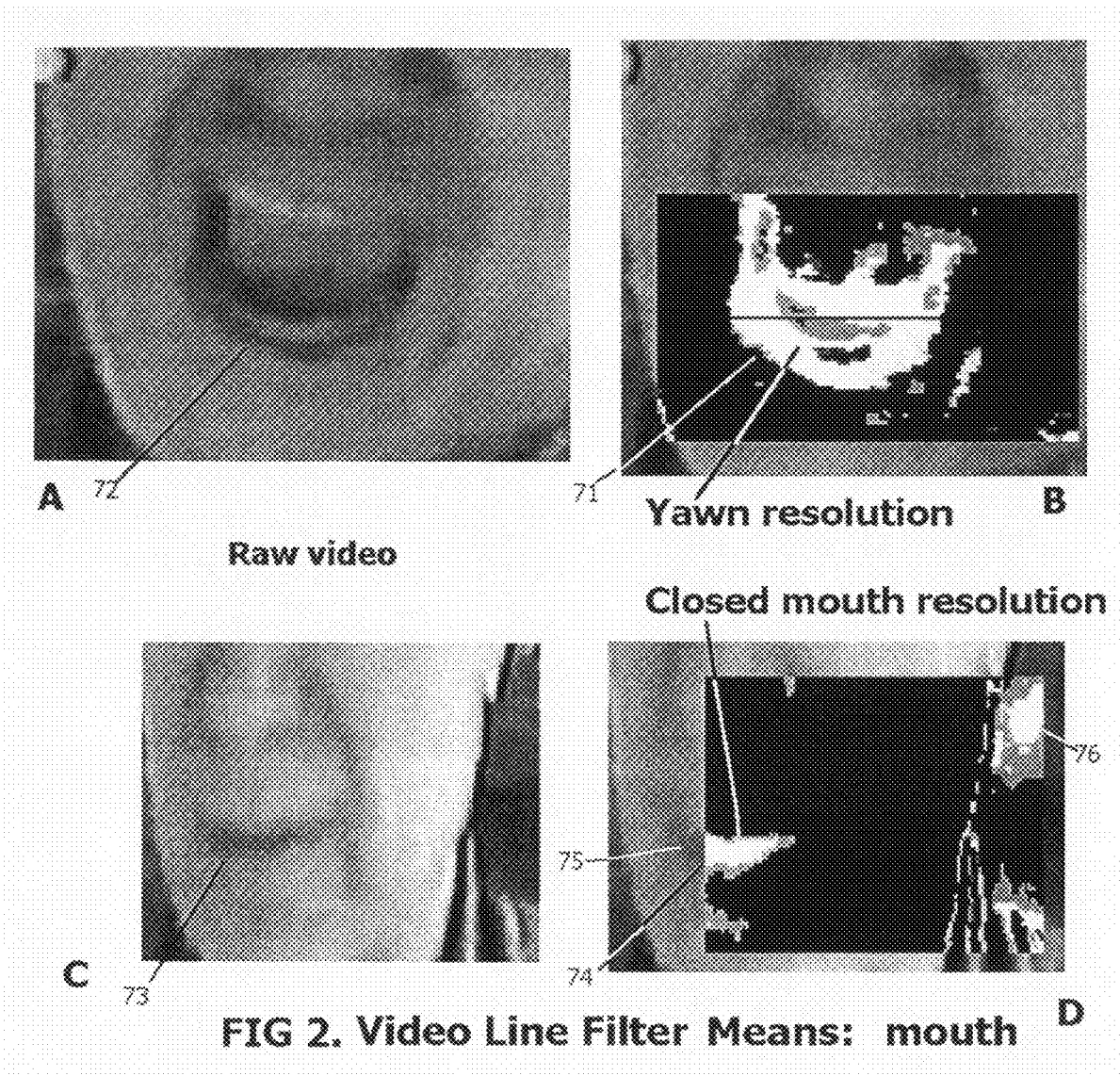
FIG 2. Video Line Filter Means: mouth

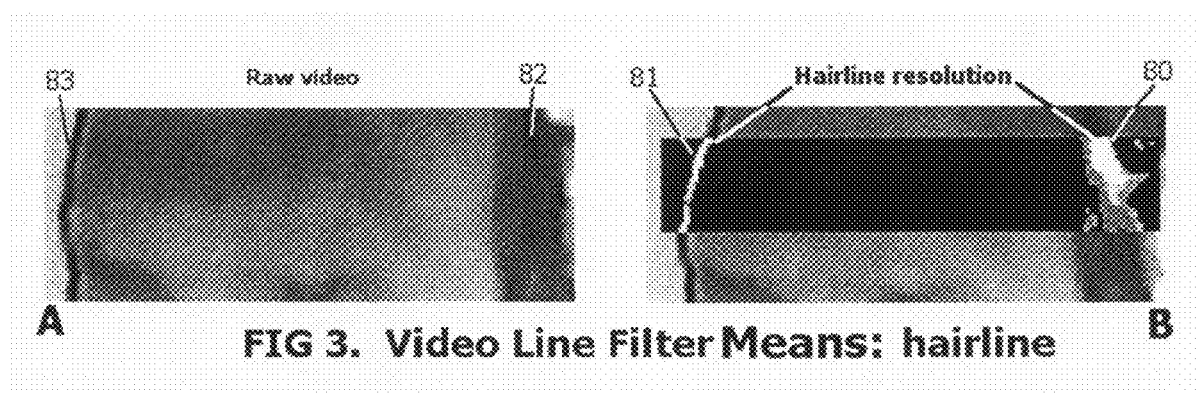
FIG 3. Video Line Filter Means: hairline

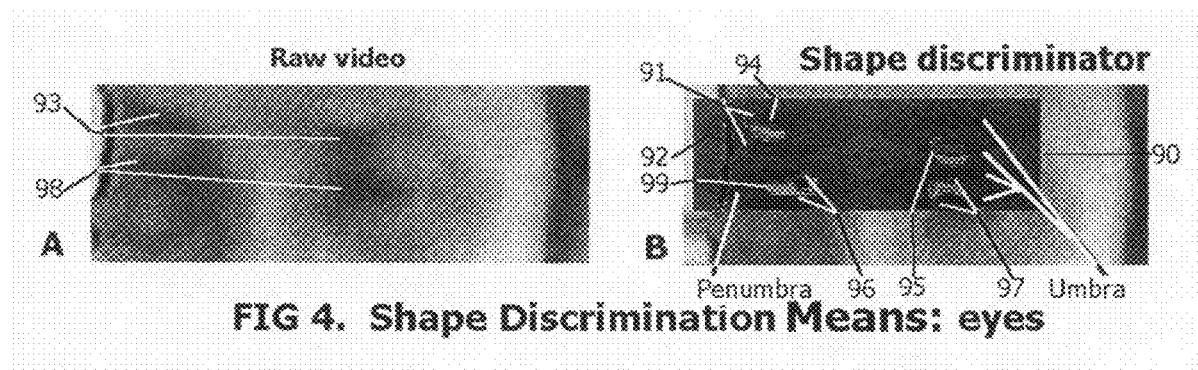
FIG 4. Shape Discrimination Means: eyes

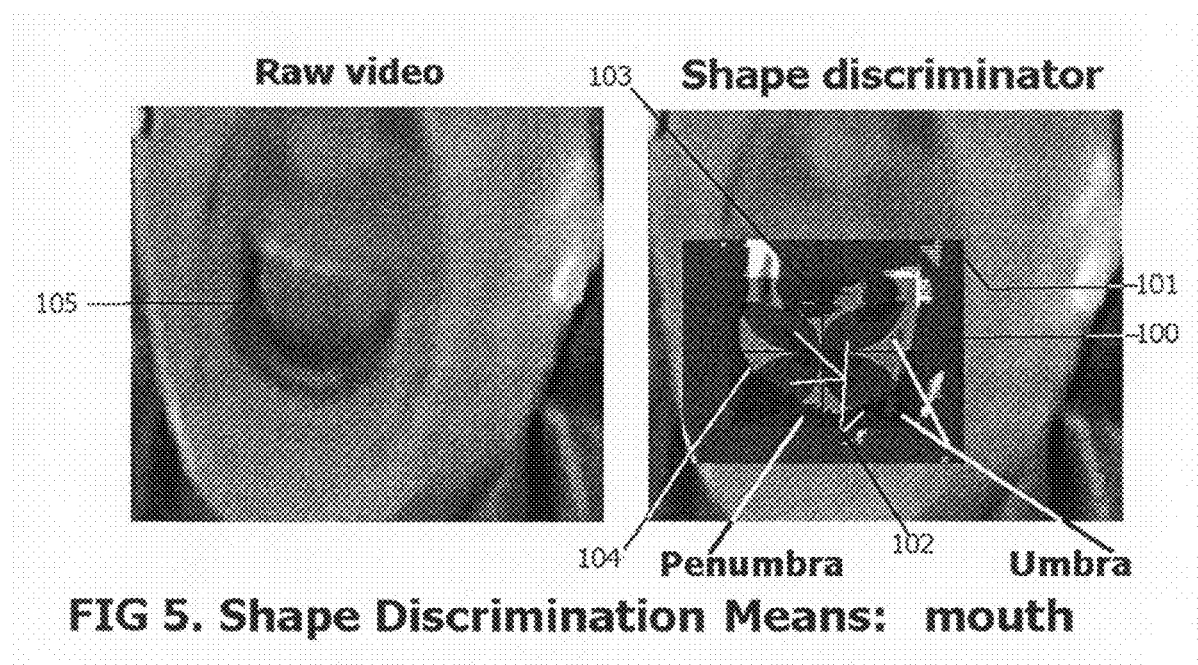
FIG 5. Shape Discrimination Means: mouth

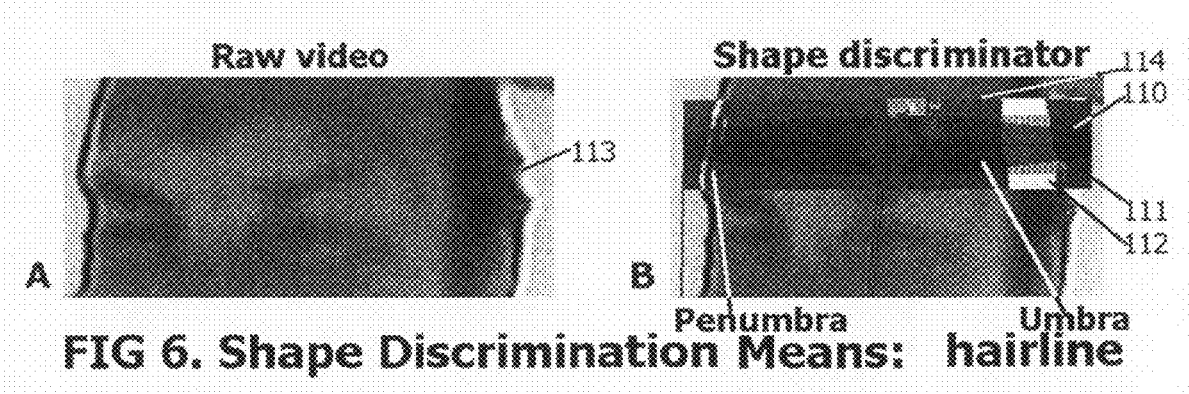
FIG 6. Shape Discrimination Means: hairline

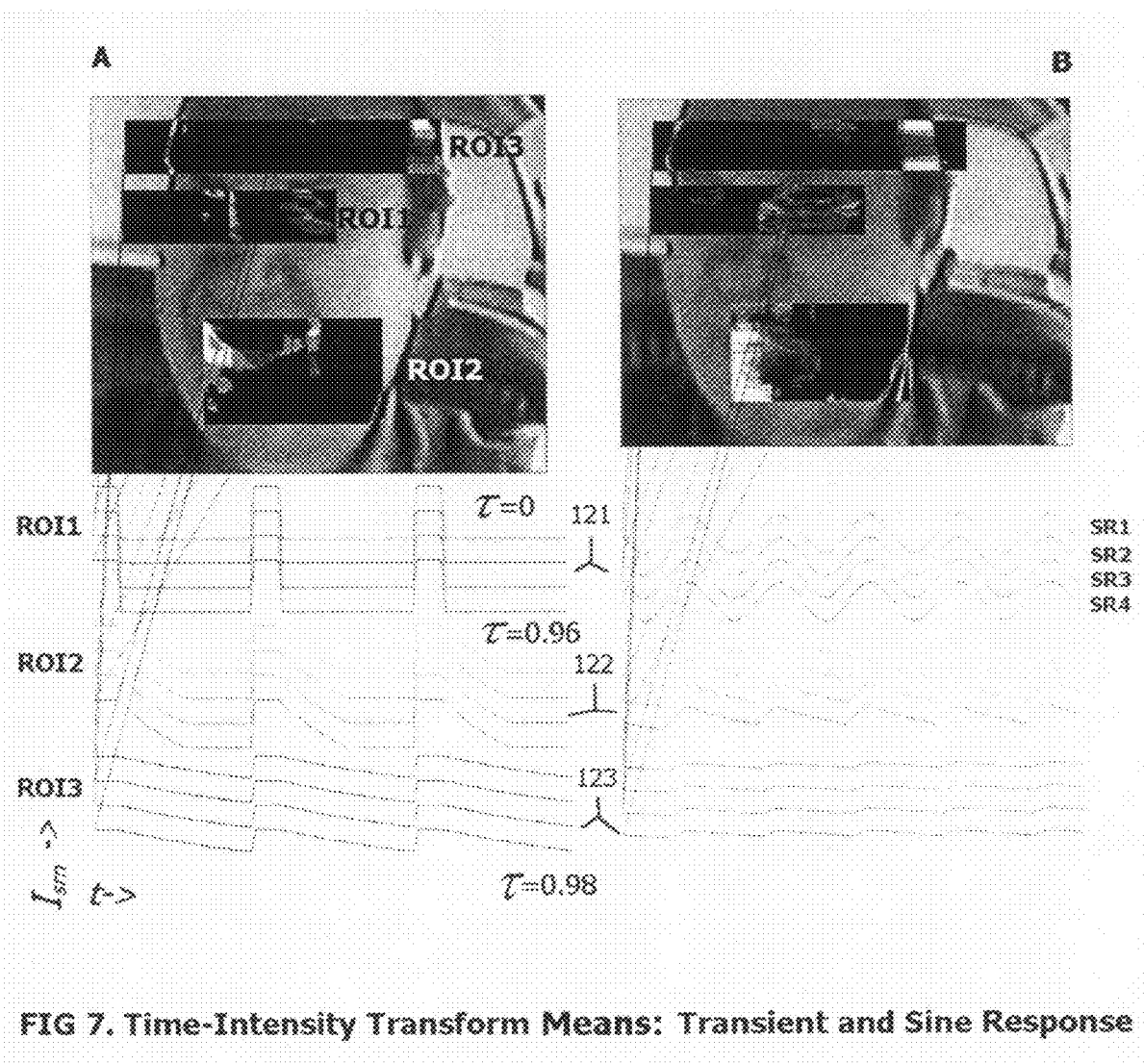
FIG 7. Time-Intensity Transform Means: Transient and Sine Response

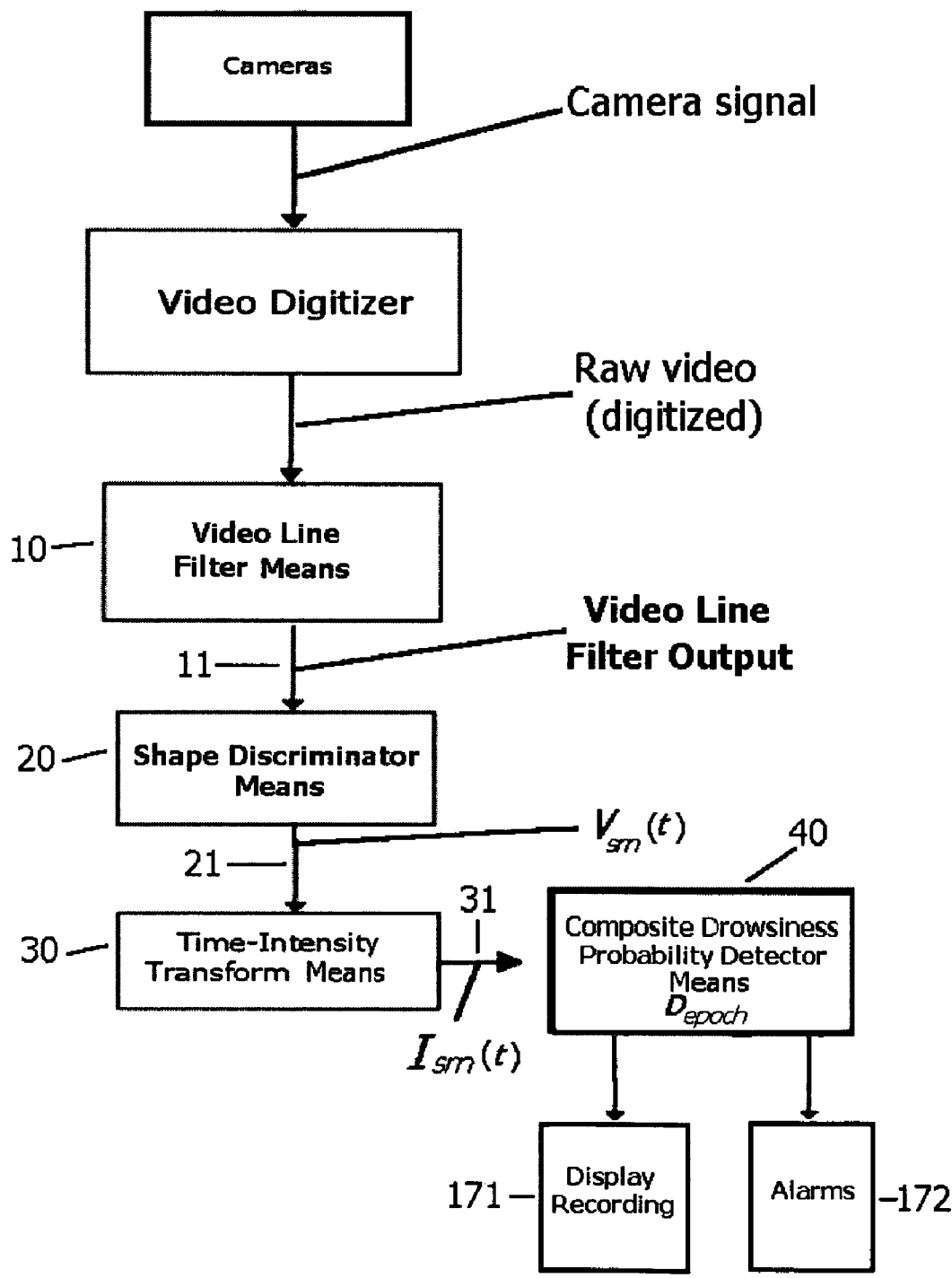
FIG 8. Signal Flow

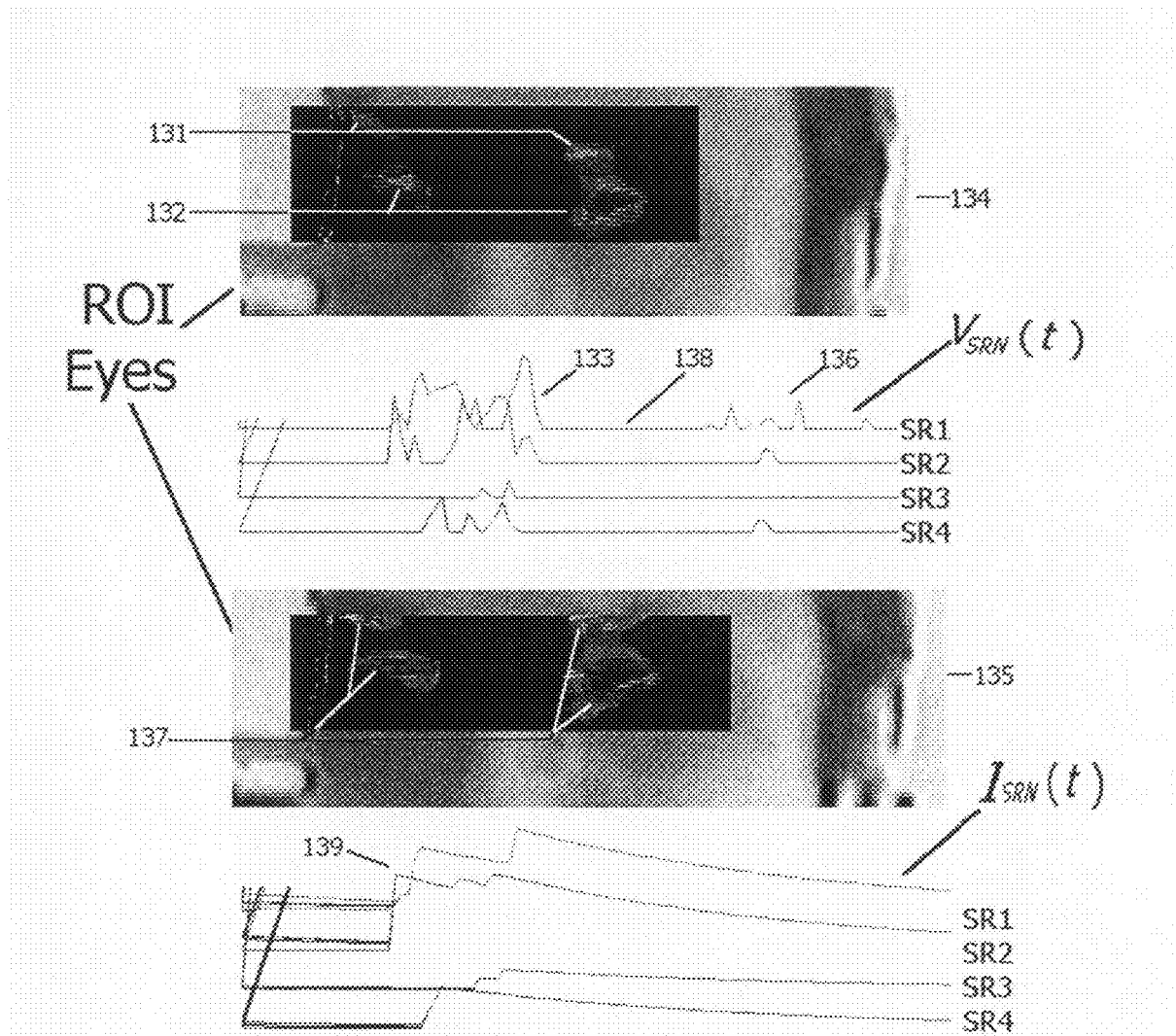
FIG. 9. SDM and TITM Outputs for Eye ROI

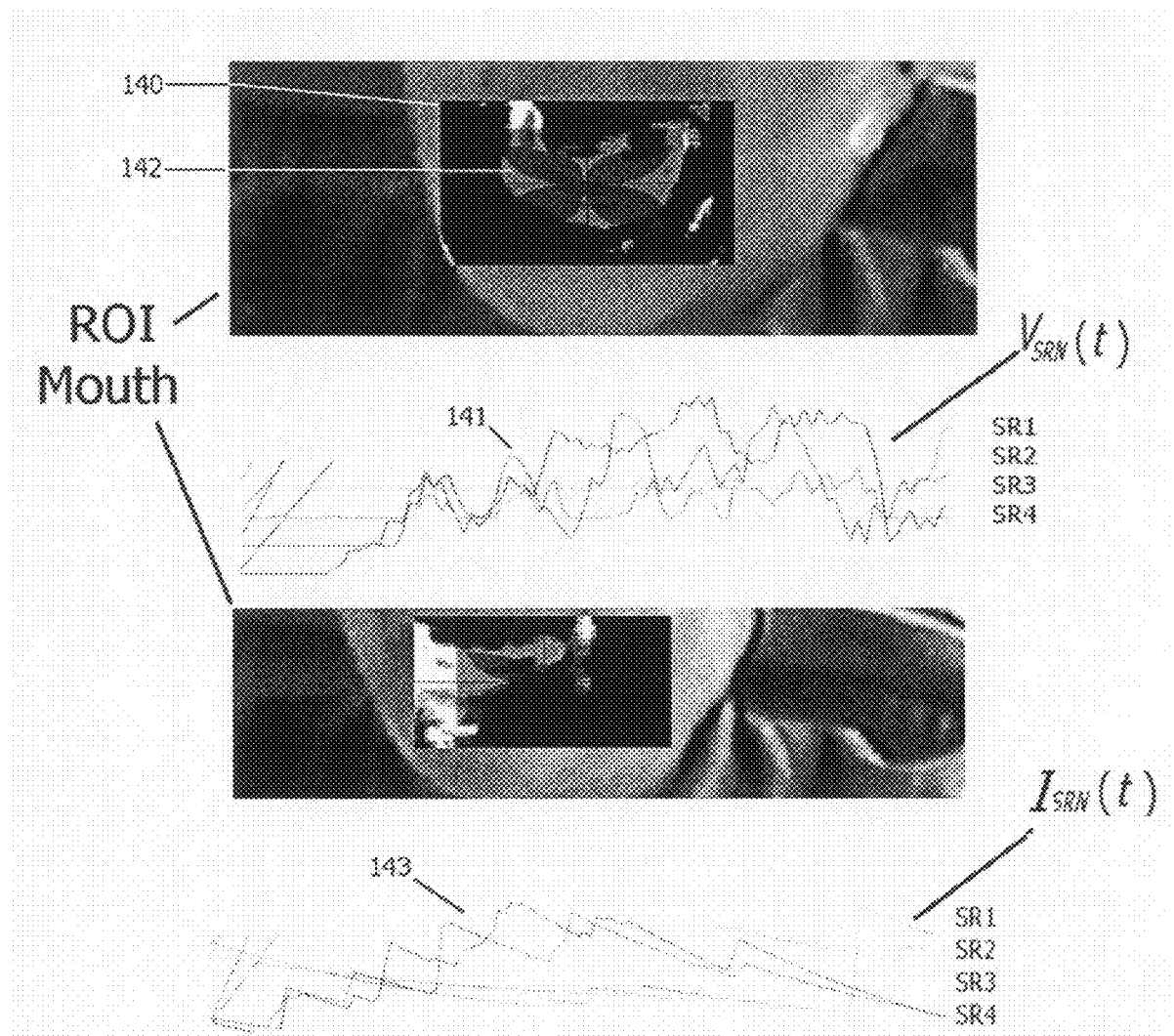
FIG.10. SDM and TITM Outputs for Mouth ROI

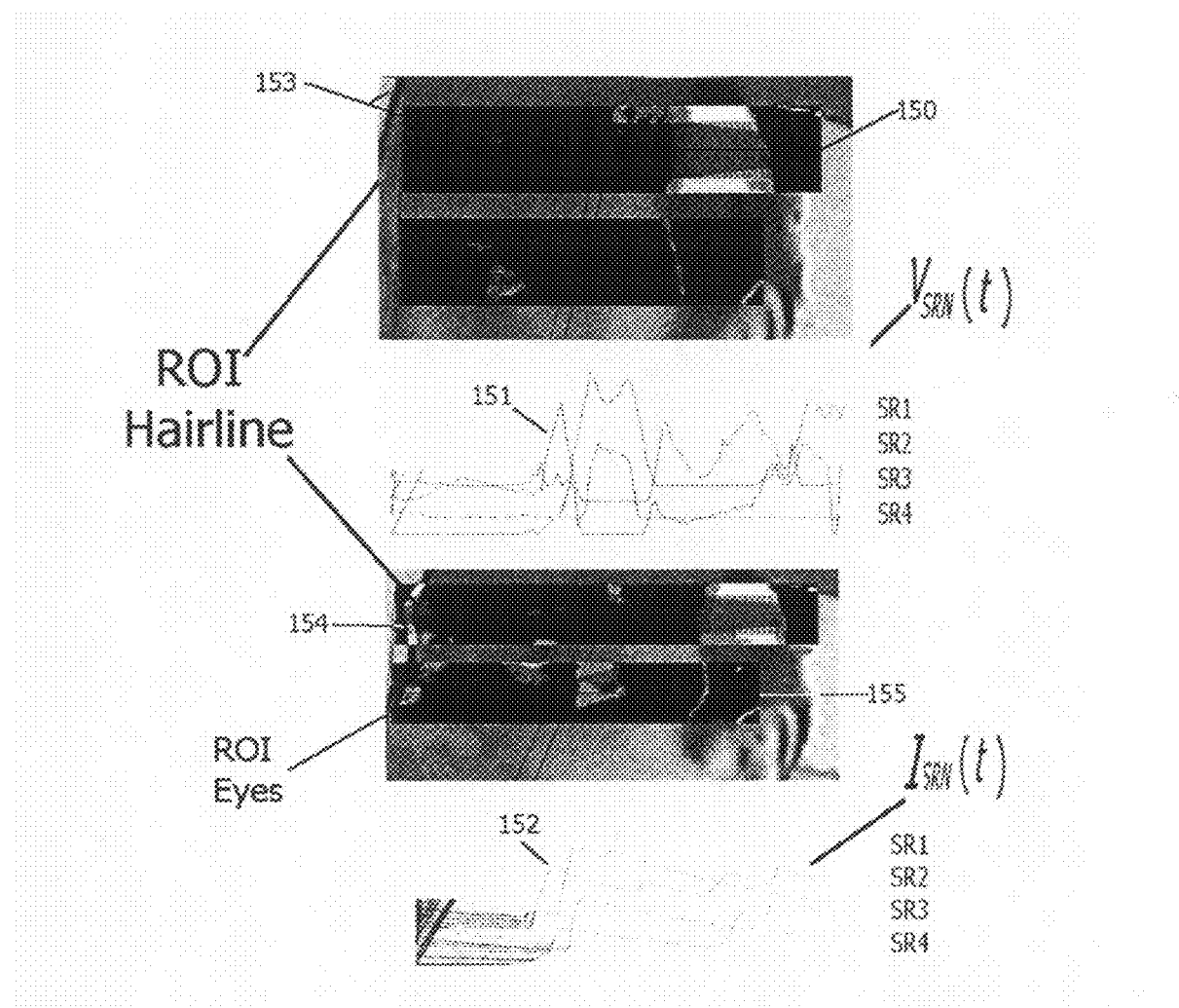
FIG. 11. SDM and TITM Outputs for Hairline ROI

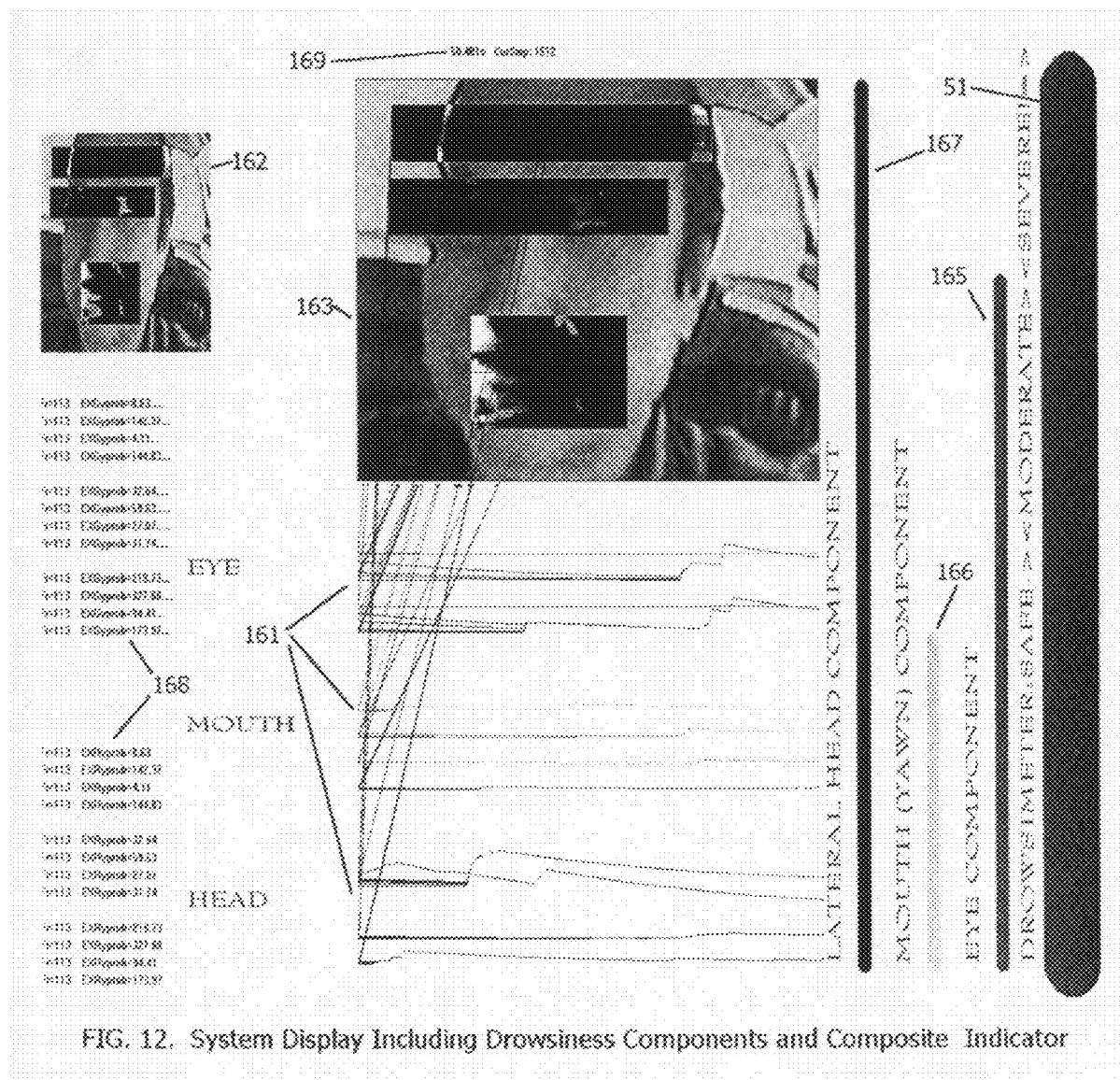
FIG. 12. System Display Including Drowsiness Components and Composite Indicator

METHOD AND APPARATUS FOR DETECTION OF DROWSINESS AND QUANTITATIVE CONTROL OF BIOLOGICAL PROCESSES

CROSS-REFERENCE TO RELATED APPLICATION

This application is a continuation of U.S. patent application Ser. No. 10/692,834 filed Oct. 23, 2003, which in turn claims priority pursuant to 35 U.S.C. §119(e) to U.S. Provisional Application No. 60/421,690, filed Oct. 28, 2002, which applications are specifically incorporated herein, in their entirety, by reference.

BACKGROUND OF THE INVENTION

1. Field of Invention

The present invention is directed to a method and apparatus for detection of drowsiness by an operator of motorized vehicles.

2. Description of Related Arts

Extraction and processing of video images have been investigated for several decades. However, only recently have systems been available with sufficient power and miniaturization to allow for digital video acquisition and processing in real time. These systems can be configured to operate with modern laptop computers or equivalent embedded processing systems to allow real time extraction of video images. The same instrument can be employed to monitor a variety of biological processes, with extraction of data in macroscopic and computerized microscopy environments to drive alarms and to produce control signals for biological production systems.

The importance of drowsiness detection has become increasingly evident with progress in sleep physiology. It is known that many vehicle operators, such as long-distance truck drivers, are sleep-deprived either because of occupational demands (long hours or non-daytime shift work) or because of sleep apnea, behavioral sleep disorders, and fragmented sleep do to physical conditions such as prostatism. Such operators are far more likely to develop drowsiness, particularly on long, monotonous runs such as freeways. The performance of drowsy drivers is much worse than that of alert drivers, and in some cases the impairments rival those of drivers who are intoxicated. Unlike intoxication, however, where the driver can reasonably anticipate that his performance would be impaired, drowsiness-prone drivers often begin their travel in an alert state and are unaware that drowsiness may encroach insidiously upon their performance. They may thus not foresee that their behavior may become dangerous, or even fatal, on the road. Similar considerations apply to truckers, train engineers, and pilots.

Drowsiness occurs in several stages. These stages have both electrophysiologic and physical correlates. One of the conventional indicators of state of alertness is the use of an electroencephalogram (EEG). Individuals who become drowsy and drift off into sleep tend to show certain characteristic EEG features. The normal alpha (8 Hz) activity is suppressed by sensory stimuli and activities in alert individuals. As drowsiness begins, the alpha amplitude increases, and the waveform becomes more regular. Then slower, more irregular rhythms take over, followed by characteristic light sleep patterns (vertex sharp waives, spindles, theta and some delta activity). By the time these latter features appear, the driver no longer is able to control his vehicle. There are serious problems in attempting to use EEG in a situation of active transportation. More specifically, attaching reliable EEG acquisition electrodes to the scalp requires skill, and certainly patience and time, beyond that possessed by the average driver, and maintaining the electrodes in position with normal head movements during driving is not generally practicable. Moreover, problems with electrical noise, generated by driver movement and the automobile environment, will generally swamp the EEG signals, whose amplitudes are in the range 5-20 microvolts, that are necessary to monitor early signs of drowsiness. Other electrical methods, such as monitoring eye movements, suffer from the same problems and are even less reliable from the physiologic viewpoint.

A variety of sensors of physiologic functions, including respiration, pulse, blood pressure, and driver movements, have also been proposed, but their reliability is relatively low, especially compared to EEG, and, again, attaching the sensors reliably is beyond the competence and interest of the average driver. At all events, a drowsiness detector must be noninvasive and independent of driver set-up behavior.

U.S. Pat. No. 6,243,015 discloses a system of continuous digital imaging wherein the vertical "eye-width" is followed continuously and a "drowsiness factor" is purportedly plotted based on the this vertical width. FIG. 3 shows the configuration of the eye needed to ascertain the vertical width, and video threshold filtering is described to ascertain that the eye is in fact being measured. However, this technique, as described, requires precise positioning of the image to obtain the 10 points of interest within the palpebral fissure, and the discrimination is dependent upon threshold determination of appropriate pixel intensity. Under real driving conditions, maintenance of this precision of eye focus is not practicable. Furthermore, variations in light intensity, eyeglass reflections, and normal driver facial mobility make determination of the necessary width values (from lateral to medial) within the fissure likely to be unreliable.

U.S. Pat. No. 6,130,617 discloses a process for digitizing video with the purpose of extracting an image of the driver's eyes. The method appears to be based on recognition of candidate pairs of points after video "binarization" of the facial data. Video threshold processing is used to assign a value to pixels having black levels "similar to that of eyes" and 0-values to all other pixels. A major problem here is the evident procedure of extracting very small regions from the full facial frame whose purported uniqueness is dependent on distance patterns that may well be produced in individual video frames at random, especially because of video noise and vibrational movements of the driver's head due to vehicle motion, and are certain to be distorted by normal driver head motion. Extensive interframe correlation appears to be necessary for validation of such points. But interframe correlation is difficult because of frequent driver head movements whose amplitude is greatly in excess of the dimensions of the points of interest and their separating distances. An additional difficulty is that, even if detection of eye position were possible as described, this would be an incomplete drowsiness detection system because of failure to integrate the behavior of other facial areas necessary for evaluation of the drowsy state, including eyebrows, mouth, and general head movement patterns.

U.S. Pat. No. 5,859,921 discloses variable video filtering used to convert given signal elements to the maximum value in surrounding regions, or to convert a signal element to the minimum value of a surrounding area, which appears to be a type of lateral inhibition filter. The diagram of their FIG. 3 indicates a filtering mechanism which, according to FIG. 4, appears to produce a binary, "all-or-none" signal level for the points of interest. This filtering procedure is claimed to compensate for varying lighting conditions, still allowing extraction of the desired feature. The filter has a predetermined length of processing (for example an eye dimension) so as to exclude larger areas like hair from the processing environment. A control signal is generated to set the filter in a maximum or minimum extraction mode. This filter output signal is used to derive X-axis and Y-axis histograms of points within relevant regions, with correlation of x and y histogram values allowing localization of the relevant structures, including eyebrows, pupils, and nostrils, for example. A major problem with this method is that a large number of time-intensive interdependent calculations must be made, with several internal feedback loops, just to compensate for light variations and other random events, for each video frame, in order to arrive at a histogram curve which is inherently ambiguous because of the multiple points in the curve that in turn need to be analyzed. The alternative to such analysis is to take an average of the histogram curve, again ambiguous, or to depend on a single point at the maximum of the histogram curve. Moreover, all of this is based on achieving an extremely high signal/noise ratio in the original signal, and compensating for variable angles of the face. The latter is accomplished by computing the axes of the face from centroid calculations, but real driving situation can distort the centroid calculation. Thus, each of these calculations is highly interdependent on a series of previous calculations, any one of which is subject to multiple sources of error. Further, since the method depends upon the final discrimination location of only a few points of relatively limited dimension, it appears likely that the noise generated in the video signal by local lighting conditions and vibrational face movements induced by car motion, irrespective of driver initiated facial movements, would be likely to confound a significant fraction of the intraframe analyses described.

U.S. Pat. No. 5,859,686 discloses a method involving formulating a reference matrix of values corresponding to a potential eye location. For each video frame, an X by Y matrix of values is compared to an X by Y block of pixels. The frame is scanned by comparing successively scanned pixel blocks to the matrix values in order to ascertain regions containing intensity blocks corresponding to the subject's pupil and a portion of the iris. As described, this method requires (a) that sufficient resolution and discrimination is possible in a real driving setting to allow a stable reference pupil-iris discriminating matrix be produced, (b) that the driver's head is maintained with sufficient stability that the matrix comparison to real-time values can be performed in the described sequential fashion over the frame, (c) that frame-to-frame correlation (stability) is adequate to provide a stable comparison matrix, (d) that a blink pattern be discriminated as a validation and confirmation of the matrix correlation, and (e) that, even given the foregoing, the eye movements detected would be sufficient to discriminate drowsiness. No actual indication is given of real driving data that correlate the values obtained by the system described, or even that reliable pupil-iris data can be obtained by this method.

U.S. Pat. No. 5,805,720 discusses video threshold processing that locates coordinates of a centroid in a region of pixels consistent with eye intensity. However, the exact criteria for distinguishing the eye specific pixel thresholds are not disclosed in such a manner that a computation method can be determined. A similar problem exists for discerning the method by which the evaluation functions and shape functions are calculated. Moreover, this method again addresses only eye dimensions and does not provide a means to compensate for general driver head motion and does not measure other facial features, to be described, as are incorporated in the present invention.

SUMMARY OF THE INVENTION

The present invention provides a method and system for detection of drowsiness using noninvasive video monitoring of a person's face. More specifically, video monitoring can be used to monitor the face of an operator of a vehicle, such as a driver of a truck, to determine whether the operator may be falling asleep while operating the vehicle. The video acquisition cameras may be mounted unobtrusively to avoid disturbing the driver or her field of view. Moreover, data acquisition can be automated and independent of specific performance of the driver. As a result of these advantages, the means described herein allow configuration of system sensitivity and specificity to an extent not readily achievable with invasive technologies in a practical driving situation.

In order to acquire data to indicate drowsiness, a camera is mounted with direct view of the driver's face, above or lateral to his field of view. This can be achieved either with a single camera at a level just below the sun visor, or by mounting two cameras laterally and alternately sampling their images. The best method (single or bilateral) of camera mounting remains to be determined, as does the optimal sampling method (visible versus infrared) for varying light conditions, but the principles are the same in either case. The video signal is digitized in real time, and the bitmap for each frame is stored in a frame buffer. The intensity of each point is processed by using a video filter whose parameters are under program control. The filter enhances the facial fiducial characteristics to produce time-varying intensity signals, suitably quantized, that correspond to regions of interest (ROIs) in which the fiducial facial features are located. These features include the palpebral fissures, eyebrows, mouth, and bilateral head boundaries. (Additional fiducials can also be configured by using the means described herein.) Each of these facial features may show variations in configuration: The palpebral fissures may narrow with drowsiness, or show excessive widening with early drowsiness as the driver attempts to compensate for sensations of drowsiness.

By altering the parameters and shape equations of this process, the present invention can also be used to monitor biological processes in which real time responses must be made to nonrecurrent, qualitatively templatable images. In the preferred embodiment, which is optimized for driver drowsiness detection, video information is transferred in real time to a digital buffer with intensity filtering characteristics such that the filtered buffer contains intensity levels consistent with a first approximation to defined feature extraction.

A second level of processing allows specific shape discrimination from the first filtered buffer. A third level of processing comprises a time-intensity transform means whose output is a quantity proportional to the probability that the discriminated feature represents driver drowsiness. The processing means are applied to individual facial characteristics. All parameters controlling the respective processing means are modifiable by feedback from an overall monitor of data quality, including ambient light levels, and there is provision for incorporating output from other transducers to adjust system performance. The means and their configuration allow system training on individual driver facial characteristics (facial fiducials) at the beginning of a driving session. At the time of training, scanning of system parameters allows creation of ROIs in the video representation of the face. These ROIs can be dynamically reconfigured for driving conditions and driver's movements. In the present embodiment, the ROIs correspond to fiducials related to eye characteristics, mouth characteristics, and head movement characteristics.

Processing means are preferably optimized for each ROI (eyes, mouth, head). For improved accuracy of results, each of the three ROIs is preferably subdivided into four subregions (SRs), and the outputs for all SRs within an ROI are correlated for improved accuracy. The system analyzes the configuration of the specified facial fiducials to preferably determine whether driver behavior represents a low (SAFE), MODERATE or SEVERE likely level of drowsiness. The system incorporates complete capability of adjustment of all measurement parameters such that final output may be correlated easily with other measures of drowsiness to establish a reliable cross correlation between video data and such other measures. This correlation will maximize the accuracy of the system on the basis of actual road testing. The system incorporates an interfacing means that produces computer-generated speech alarms and provides electrical triggers for external alarm devices upon the appearance of each of the nonsafe drowsiness levels. Data processing occurs in real time.

Evaluation of the levels is preferably displayed graphically, and alarms are preferably actuated as indicated, at the end of an analysis epoch (typically 4 seconds) whose length is under program control. The system incorporates provision for continuous recording of all data.

BRIEF DESCRIPTION OF THE DRAWINGS

FIG. 1 demonstrates the operation of the Video Line Filter Means of the present invention to select video intensity regions related to detection of the eye complex.

FIG. 2 demonstrates the operation of the Video Line Filter Means of the present invention to select video intensity regions related to detection of mouth behavior (yawn).

FIG. 3 demonstrates the operation of the Video Line Filter Means of the present invention to select video intensity regions related to the hairline movement that indicates lateral head movement.

FIG. 4 demonstrates the operation of the Shape Discrimination Means of the present invention related to detection of the eye complex.

FIG. 5 demonstrates the operation of the Shape Discrimination Means of the present invention to select video intensity regions related to detection of mouth behavior (yawn).

FIG. 6 demonstrates the operation of the Shape Discrimination Means of the present invention to select video intensity regions related to the hairline movement that indicates lateral head movement.

FIG. 7 demonstrates the transient and sine response of the Time-Intensity Transform Means of the present invention.

FIG. 8 shows the signal flow of the present invention.

FIG. 9 shows the output signals of Shape Discrimination Means and the Time-Intensity Transform Means of the present invention for the eye complex.

FIG. 10 shows the output signals of Shape Discrimination Means and the Time-Intensity Transform Means of the present invention for the mouth (yawn).

FIG. 11 shows the output signals of Shape Discrimination Means and the Time-Intensity Transform Means of the present invention for the hairline movement that indicates lateral head movement.

FIG. 12 depicts the system display of the present invention, including drowsiness components and composite drowsiness indicator.

DETAILED DESCRIPTION OF THE PREFERRED EMBODIMENT

The preferred embodiment of the present invention will now be described with references to FIGS. 1-12.

Drowsiness probability calculation in accordance with the preferred embodiment of the present invention is preferably based on the operation of three sequential means of processing (see FIG. 8): the video line filter means (VLFM) 10 operating on raw digitized video data, the shape discrimination means (SDM) 20 operating on the output of VLFM, and the time-intensity transform means (TITM) 30 operating on the output of SDM. The TITM outputs from the SRs 41 within the ROIs 42 (see FIG. 1) for the facial fiducials are then used to calculate a composite drowsiness probability 51 (See FIG. 12). The operation of these means is described as follows.

Operation of VLFM is demonstrated in FIGS. 1-3. A ROI 42 is created by selecting a region of the video frame buffer corresponding to coordinates under program control. In the Figures, these are the shaded regions. Gradations of shading show the symmetrical rectangular SRs, SR1-SR4 41, within the ROI. For each video line, the video intensity of every pixel is compared to a range of intensities, also set under program control. If the pixel intensity is within the range, the pixel is preferably reset to 255; otherwise it is preferably reset to 0. Test pixel intensity is determined as the ratio to a reference value that may be set to the average value for the entire SR, thus providing a means to correct for changes in ambient light level. (Frame SR reference values for calculation of average SR intensity are preserved in a shadow frame buffer which is read-only during all operations for a given frame.) In the present embodiment, this process is preferably performed independently for the green and red color values of the pixel, though a blue channel may also be computed, which may be analyzed separately or computed as a linear combination. In practice, with bright daytime illumination, the G and R values tend to closely approximate, and the simple sum appears to suffice, but this condition may vary with road conditions, time of day, and other environmental factors requiring further research in road testing. FIG. 1A shows the raw video 60 on which SR VLFM filtering is performed in B. The filtering process passes only intensity levels corresponding to the eyebrow and palpebral fissure. In this instance, the eyebrows 61 appear as bright regions in SR1 and SR3, while the fissures 62 appear in SR2 and SR4.

The same process can be employed to resolve mouth geometry, as shown in FIG. 2. The intensity levels in B 71 correspond closely to the boundaries of the yawn 72 in A. For raw video of the closed mouth condition in C 73, the intensity in D shows good correspondence 74. Note, however, that a portion of the mouth is outside the ROI 75 because of head movement, and portions of the car seat to the left of the driver also generate active pixels 76. However, most non-mouth intensity components are preferably eliminated. SDM (below) will operate on this pixel data, and, as shown below, will exclude most artifacts of this type. FIG. 3 demonstrates the same process for the hairline 80. In the absence of a clear hairline, the intensity parameters can be adjusted to discriminate the lateral edges of the face or forehead by differential intensity change (edge detection) with comparison to non-head surrounding features. Note the asymmetry of the hairline because of the rightward lateral head deviation 81. The intensity patterns correspond to the hairlines in the raw video 82, 83 in FIG. 3A. Quantification of this deviation will be demonstrated below.

Operation of the SDM is shown in FIGS. 4-6. Each ROI has a characteristic shape organization which is configured to the expected fiducial shape to be detected. Thus, in FIG. 4B, for the eye ROI 90 the characteristic shapes for eye position detection are indicated by the two dark ovals 91 which are set to detect horizontal bands likely to represent the eyebrow or palpebral fissure. These ovals form an umbra. Surrounding them is a bicrescentic penumbra 92. As referenced in the raw video of FIG. 4A 93, eyebrow selection by VLFM is evident in SR1 94, where a portion of the eyebrow selected intensity region impinges on the upper umbral component, and in SR2 95, where a portion of the eyebrow selected intensity region impinges on the lower umbral component. Similarly, the palpebral fissure selection by VLFM is impinging on the margins of the upper and lower umbras in SR3 96 and in SR4 97, as derived from the raw video 98.

In all these cases, for this frame, a significant portion of the selection, as represented by the respective areas of fiducial intensity, falls within the penumbra rather than the umbra 99. The SDM computes the difference between the area of the intensity shape impinging within the umbra and the weighted area of the intensity shape falling within the penumbra. Any intensity area outside both the umbra and penumbra is ignored entirely as clear artifact. The intensity area within the umbra represents signal, corresponding to the expected facial fiducial, in this case eyebrow or palpebral fissure. The intensity area within the penumbra is considered noise, artifact unrelated to the facial fiducial. Thus, the subtraction process acts to produce lateral inhibition, exactly analogous to the process that occurs in the retina to increase visual contrast and reject noise. In this case, however, the lateral inhibition is keyed to the expected shape, and is perhaps more closely approximated, at least by analogy, to more critical cortical discrimination, rather than retinal discrimination functions.

The overall effect, accordingly, is to produce clear signals related to the presence of facial fiducials of the appropriate configurations when, and only when, these fiducials appear within the appropriate regions. Each area difference is converted to a scalar, the characteristic intensity value (CIV) for the given SR in its ROI within the current video frame; this scalar is thus the output of the SDM for this SR (one of 12 SR channels, i.e., 3 ROI X 4 SR/ROI) within its respective ROI for the current frame. A portion of valid fiducial component is cancelled by the process because a portion of the fiducial may fall within the penumbra 99, thus reducing signal level. However, due to the shape configurations of the umbra and penumbra in relation to the expected shapes of the fiducials, an even greater amount of noise is cancelled on average by artifact falling within the penumbra, thus improving the fiducial shape signal/noise ratio. The net result, as will be shown below, is improved reliability of fiducial detection.

A similar process occurs for the mouth ROI 100 and its associated SRs 101, as shown in FIG. 5. In this case, however, because the fiducial is radially, rather than horizontally, symmetric, the appropriate umbral shape is the modified flower petals 102, oriented within the respective SRs as shown. The penumbras 103 for the SRs are set as rectangles. The intensity levels 104 corresponding to the yawn in the raw video 105 impinge, as in the eye case, both on the umbral regions 102 and on the penumbral regions 103 in each of the SRs. The lateral inhibition process operates here exactly as for the eye case. The hairline case again presents a somewhat different problem, as shown in FIG. 6. Here the shape does not change so much as its location within the umbra/penumbra complex. Therefore the umbra is trapezoidal 110. The penumbra is a modified rectangular shape 111. Thus, as a primarily vertically oriented cord of hair intensity within the hairline ROI 112, corresponding to the hairline in the raw video 113, crosses an associated SR 114 moving centrally, the ratio of umbral coverage to penumbral coverage increases, resulting in an increasing CIV for the SR. SR1 and SR3 will show correlated increases in CIV for movement centrally of the right hairline, while the SR2 and SR4 will show correlated increases in CIV for movement centrally of the left hairline.

The coordinates of the ROIs, the VLFM intensity ranges for each of the SRs, and the shape equations governing the generation of the SDM umbras and penumbras are all preferably controlled by program parameters based on an initialization training session, and all are modifiable by ambient light levels and signal quality. These initial settings can be achieved by a training routine such that the subject driver opens and closes eyes, opens and closes mouth, and rotates head to left and to right upon program instruction. Within broad initial SRs set at program startup, the system will search for changes in intensity levels for each of these actions, and set the running coordinates of the SRs, VLFM parameters, and SDM shape equation parameters to maximize the CIV changes for the fiducial maneuvers, requested. The system will then begin automatic computations.

TITM operates on each of the 12 channels of output from SDM, one channel for each SR, to produce a time-varying transformation of the CIV for each SR. The input to each TITM channel thus comprises one of 12 signals, i.e., one of the CIVs for each of the SRs, that are functions of time, and the TITM output for each SR is a value indicating the probability of drowsiness from that SR. An appropriate combination (linear in the present embodiment) of transformed CIVs gives rise to a composite value that is the system assessment of the probability of the level (SAFE, MODERATE, or SEVERE) of drowsiness. For a given SR within an ROI assigned to a facial fiducial, let $I_{srn}(t)$ represent the TITM output value for that channel at time position t corresponding to a given frame within an analysis epoch.

As configured in the present embodiment, $t_{initial}=0$, representing the beginning of the given epoch, $t_{final}=120$ representing the end of the epoch, chosen in the present embodiment as ~4 sec. The frame time increment, i.e., actual time elapsed between epoch positions t−1 and t is ~33 ms for standard video frame processing. $I_{srn}(t)$ then indicates probability of drowsiness generated from the nth ($1^{st}$, $2^{nd}$, $3^{rd}$, or $4^{th}$) SR of the given ROI (for eyes, mouth, or hairline). The algorithm of TITM is the following:

$$I_{sm}(t) = \begin{cases} V_{srn}(t), & V_{srn}(t) \geq I_{sm}(t-1) \\ \tau_{sm} I_{sm}(t-1), & V_{srn}(t) < I_{sm}(t-1) \end{cases} \quad \text{Eq. (1)}$$

where $V_{srn}(t)$ is the CIV from SDM for the $n^{th}$ SR at time position t. $\zeta_{srn}$ is an exponential decay time constant (typically having a value of 0.98) that determines the rate at which the $I_{srn}(t)$ value falls off in the absence of an input signal satisfying the condition $V_{srn}(t) \geq I_{srn}(t)$. The effect of this computation is shown in FIG. 7. TITM output is shown across an epoch for each of the SRs associated with each of the ROIs as indicated in the Figure. (Diagonal lines at the left of the graphs are pointers to the SRs associated with each of the graphs.)

A calibration signal, rather than the driver SR output signals, is introduced here to demonstrate TITM response. With $\zeta_{srn}=0$, no modification of the input signal occurs. This is demonstrated for the SR graphs of ROI1 121. With $\zeta_{srn}=0.96$ (set for RO12) 122, decay is too rapid for reliable functioning in relation to driver behavior. With $\zeta_{srn}=0.98$ (shown for RO13) 123, the system presents a reasonable approximation with which accurate assessment of behavioral significance in the driver is attained. The rationale for choosing the $\zeta_{srn}$ value will be discussed below. System response is shown for a rectangular calibration signal (A) and sinusoidal calibration signal (B). In both cases, as will be seen below, the TITM responses are as required for behavioral assessment when $\zeta_{srn}$=0.98.

FIG. 8 shows the overall signal processing operation. For each SR in each ROI, the signal flow includes VLFM operation 10 on digitized video, yielding a VLFM output signal 11. The SDM 20 operates on the VLFM signal. TITM operates on the CIV 21 from the SDM. In the present embodiment, a composite measure of drowsiness is then derived by the composite drowsiness probability detector (CDPD) 40 from a linear combination of the $I_{srn}$ 31 as follows:

$$P_{alrt} = C_{Eye} \sum_{RE} I_{RE}(t) - C_{Mth} \sum_{RM} I_{RM}(t) - C_{Hd} \left[ h_L \sum_{RHl} I_{RH}(t) + h_R \sum_{RHr} I_{RH}(t) \right] \quad \text{Eq. (2)}$$

where $P_{alrt}$ is a measure of alertness; $C_{Eye}$, $C_{Mth}$, and $C_{Hd}$ are gain parameters for the signals from the ROIs for eyes (RE), mouth (RM), and head (RR) respectively; $h_L$ and $h_R$ are parameters to adjust for hairline or other head asymmetries for the left head SRs (denoted as RHl) versus right head SRs (denoted as RHr); $I_{RE}(t)$ are the TITM output signals for the eye SRs, $I_{RM}(t)$ are the TITM output signals for the mouth SRs, and $I_{RH}(t)$ are the output signals for the hairline SRs. $P_{alrt}$ thus increases when eye position meets the criteria, computed from SDM and TITM, for attaining standard position, and decreases when yawning or lateral hairline deviation occurs. An overall measure of drowsiness for the epoch, $D_{epoch}$ then may be computed as $D_{epoch}=D_0-P_{alrt}(t_{final})$, $D_0$ being a constant chosen so that $D_{epoch}$ ranges from 0 (an alert state) to $D_{max}$, a severely impaired state approaching actual sleep. The $D_{epoch}$ signal is monitored to provide a display and recording of drowsiness 171 and to trigger alarms 172. All parameters are freely adjustable under program control and can thus be optimized dynamically for an individual driver's facial fiducials and behavioral characteristics, as well as for changes in driving conditions.

Output from the invention when processing video input from an actual driver is demonstrated in FIGS. 9-12. In FIG. 9, the $V_{srn}(t)$ output from SDM is shown for an epoch in which the eye (left and right eyebrows 131 and fissures 132) complex crosses the standard position and is therefore detected 133. The degree of correspondence of the eye complex components for each of the SRs to the standard position for the given SR is indicated by upward deflection in the respective trace, one for each of the SRs.

Note that not all components are equally increasing at any instant because of normal facial and behavioral variation. Thus, the sum of correspondences is a better, more reliable measure of attainment of standard eye position than a single component would be. The upper video 134 is representative of detection for a frame during the first large complex indication, while the lower video 135 represents a frame during the smaller peaks later in the traces 136. In the latter case, the correspondence is less exact because of skewed eye complex positioning and more artifact 137; hence the deflections in the SR traces are smaller to indicate less precise attainment of the standard position. The nondeflected (0-level) portions of the traces indicate the eye complex out of position altogether 138.

The $I_{srn}(t)$ output from TITM is shown in the lower traces. This signal is better correlated with behavior relevant to driving in terms of overall significant eye complex positioning.

A driver typically does not maintain constant head or eye position in the normal course of driving. Attainment of standard position, even for an alert driver, occurs only briefly, but should occur frequently. The $I_{srn}(t)$ signals therefore provide a better representation of the relationship of eye position to alertness than the $V_{srn}(t)$ signals. The detection of the first complex results in a clear upward deflections 139 in each of the associated SR channels that fall off gradually after the eyes move out of position. In the absence of another similar positioning, the traces continue to fall off with time, indicating decreasing probability, in the absence of repetition, that this single positioning is related to alertness. These probabilities would again increase upon presentation of another attainment of eye position. The $I_{srn}(t)$ are therefore measuring the alertness probability for the eye component as a behaviorally correlated value.

FIG. 10 demonstrates similar signal processing for the mouth ROI 140. Here, the $V_{srn}(t)$ signals 141 represent the degree to which mouth position represents a yawn 142, as determined by SDM according to FIG. 5. Like the case of eye movements, a behaviorally significant change in mouth configuration requires behavior consistent beyond a few frames. Just as in the eye case, TITM processes these signals to yield $I_{srn}(t)$ 143, which are the behaviorally linked signals shown in the lower graphs. This is a complex response because the yawn continues throughout most of the epoch and in fact continues into the next epoch. In this case, however, opposite to the eye case, the increasing signal signifies a yawn and is thus associated with decreased alertness (i.e. increased drowsiness). These signals, as indicated in Eq. 2, are therefore subtracted in the computation of $P_{alrt}$. The upper video is a frame during the peak indications of yawn, while the lower video is taken near the end of the yawn indication.

FIG. 11 shows the operation for the hairline ROI 150. Here, too, transient head movements occur very frequently in normal driving and often are not associated with drowsiness, It is rather the slower, more sustained deviations from standard position that are of concern. Thus, in this case as well, the $V_{srn}(t)$ signals fluctuate more variably and are seen here to increase as head movement occurs 151, while the $I_{srn}(t)$ signals, derived from the $V_{srn}(t)$ by TITM, represent the behaviorally significant correlate with respect to drowsiness. The $I_{srn}(t)$ are shown in the lower traces The increase in the $I_{srn}(t)$ 152 thus occurs with the onset of head movement as manifest by the increase in $V_{srn}(t)$, but the response of the $I_{srn}(t)$ is better related to the relevant behavior. The upper video shows more severe rightward head deviation associated with signals at the middle of the trace, while the lower video shows partial return toward the standard (center) position. In the upper video, the right hairline is entirely out of the ROI 153 but has returned in the lower video 154. But, because multiple ROIs are correlated, the overall signals is still accurate in depicting even the severe lateral head movement. It should also be noted that VLFM is operating in the hairline ROI to acquire pixel intensities appropriate to the hairline, while at the same time VLFM is operating in the eye ROI to acquire intensities appropriate to the eye fiducials. It can be seen that there is relatively little cross talk, with good suppression by eye VLFM operation of the hairline in the eye ROI 155.

FIG. 12 shows the composite system display. The $I_{srn}(t)$ graphs for all the SRs 161 are shown for the current epoch, as well as the video results of VLFM 162 and SDM 163 processing. At left are numerical printouts for the $I_{srn}(t)$ 168 generated by the current frame 169. A composite drowsiness indicator 51 is shown at right, which displays results from the previous epoch. This indicator is updated at the end of each epoch.

The composite indicator measures $D_{epoch}$, as indicated in FIG. 8. This is the wide vertical graph at far right 51. The components for eyes 165, mouth (yawn) 166 and hairline (lateral head movement) 167 are shown to the left of the composite indicator. The color of the composite indicator 51 varies with its level, and alarms (audio and electrical, see FIG. 8) 172 can be triggered at program controlled levels of $D_{epoch}$. By altering the shape equations of the present embodiment, the pattern recognition can be shifted to defect arbitrary biological shapes such as those generated by computerized microscopy. Digital and analog electrical control signals can then be generated, analogous to those graphed in FIG. 12, to control the process generating such biological shapes.

I claim:

1. An apparatus for monitoring a biological process, said apparatus comprising a processor programmed to perform a method, said method comprising:

receiving image data of an object having one or more features, said image data corresponding to frames comprising a plurality of pixels;

dividing each frame into one or more regions based on the one or more features and each region into one or more subregions;

filtering pixels in each subregion according to a pixel intensity range to provide a filtered output of pixels;

defining for each frame a first area within each subregion, said first area defined by one or more predetermined shape equations according to a shape of a feature to be monitored in the subregion and defining for each frame a second area within each subregion, said second area adjacent to said first area; and evaluating for each frame the number of filtered output of pixels in the first area for each subregion to transform the image data to a scalar feature signal for each subregion wherein said step of evaluating comprises determining for each frame the difference between the number of filtered output pixels in the first area and the number of filtered output pixels in the second area and outputting a value of the difference to produce the scalar feature signal for each subregion.

2. The apparatus of claim 1 wherein the processor is programmed to
   perform the method further comprising:
   detecting one or more changes in a feature in a first area in a subregion; and
   modifying parameters of said shape equations defining said first area to correspond to the detected changes.

3. The apparatus of claim 1 wherein the processor is programmed to perform the method further comprising:
   transforming each scalar feature signal to produce a behavior indicating output signal for each subregion.

4. The apparatus of claim 3 wherein the processor is programmed to perform the method further comprising:
   combining the behavior indicating output signals for each subregion to obtain a composite behavior indicating output signal to monitor the biological process.

5. The apparatus of claim 4 wherein the processor is programmed to perform the method wherein said step of combining comprises linearly combining the behavior indicating output signals.

6. The apparatus of claim 4 wherein the processor is programmed to perform the method further comprising:
   correlating the composite behavior output signal with one or more independent measures of the biological process so as to increase the accuracy with which the composite behavior output signal monitors the biological process.

* * * * *